April 5, 1966 I. G. GOERING 3,244,906
TRANSISTOR MONOSTABLE MULTIVIBRATOR CIRCUIT
Filed Dec. 4, 1962
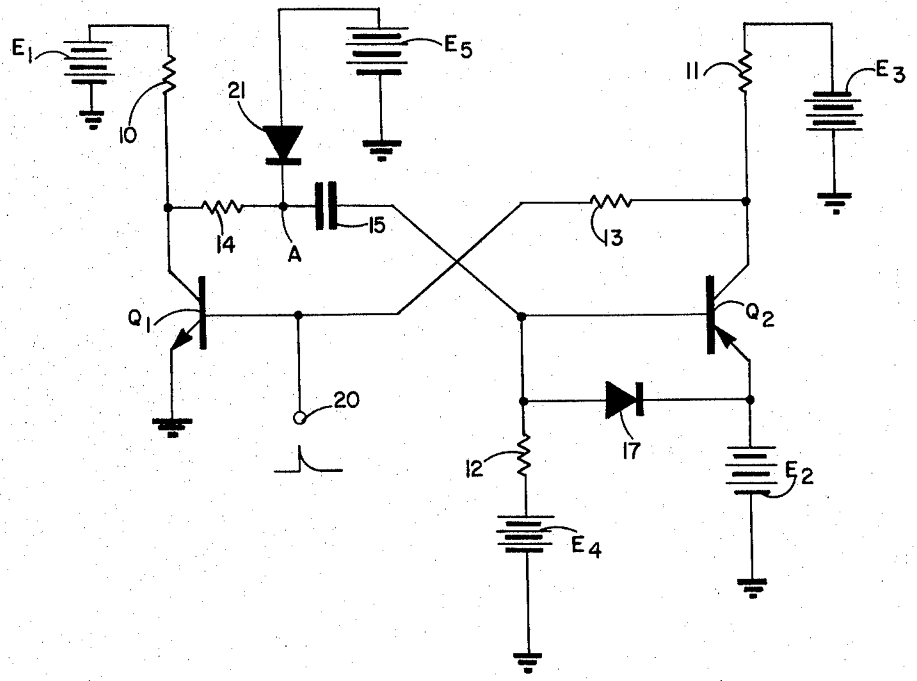
INVENTOR.
IVAN G. GOERING
BY A. M. Fernandez
ATTORNEY United States Patent Office 3,244,906

Patented Apr. 5, 1966

3,244,906
TRANSISTOR MONOSTABLE MULTIVIBRATOR CIRCUIT

Ivan G. Goering, Orange, Calif., assignor to North American Aviation, Inc.

Filed Dec. 4, 1962, Ser. No. 242,140
3 Claims. (Cl. 307—88.5)

This invention pertains to a monostable multivibrator circuit, particularly a transistor monostable multivibrator circuit, and is directed to improving the accuracy of timing the unstable mode of operation and the speed of recovery of a monostable multivibrator circuit.

Many monostable multivibrator circuits have been devised in the past utilizing two cross-coupled transistors which, upon being triggered, switch to an unstable mode of operation until a storage capacitor in one of the cross-coupling circuits charges, or discharges, through an impedance path. The RC time constant of the capacitor and impedance path determines the period of the unstable mode of operation. However, since the capacitor charge changes exponentially, the time at which the charge reaches a predetermined point that causes a reverse transition in the circuit to return it to its initial stable or quiescent mode of operation is uncertain if the predetermined point is selected to be after the first or second time-constant period and becomes less certain after the third time-constant period. Therefore, for accurate timing, the point during the exponential charge or discharge of the capacitor at which the transition should be caused to occur is during the first or second time-constant period while the rate of change of the capacitor charge is large for then the time at which the capacitor charge reaches the predetermined point may be more precisely determined and variations of the bias potentials in the circuit due to ambient changes in the power supply sources will have a minimum effect on timing.

An object of the present invention is to provide an improved means for timing the unstable mode of operation of a monostable multivibrator.

After a monostable multivibrator has been returned to its stable mode of operation, the storage capacitor must be returned to its initial condition before the circuit may be triggered again for another cycle of operation. For certain applications, it is necessary to recycle the multivibrator at a high repetition rate. The highest repetition rate which may be achieved is determined by the time required to restore the storage capacitor to its initial condition.

Accordingly, another object of the invention is to provide an improved means for speeding the recovery of a monostable multivibrator.

These and other objects of the invention are achieved in a complementary monostable multivibrator comprising a pair of cross-coupled transistors of opposite conductivity type biased to be non-conductive in the stable or quiescent state. A trigger pulse applied to the base electrode of either one of the transistors renders it conductive whereupon a regenerative action ensues through the cross-coupling circuits to drive both of the transistors into saturation in the usual manner until the storage capacitor in the cross-coupling circuit from the collector of one transistor to the base of the other transistor discharges sufficiently to cut off current to the base of the transistor to which it is connected. When current is cut off in the base of the one transistor, the one transistor is cut off thereby cut-off biasing the other transistor. In order to stabilize the timing of the unstable period of operation, the time at which current is cut off from the base electrode of the one transistor is established by a clamping diode which prevents it from discharging beyond a certain point arbitrarily selected to be during the first or second time-constant periods of the capacitor and its discharge path. A diode connected between the base and emitter electrodes of the one transistor is so poled as to provide a low-impedance recharging path for the storage capacitor, thereby speeding the recovery of the circuit.

Other objects and advantages of the invention will become apparent from the following description and claims, taken together with the sole figure in the accompanying drawing which discloses a schematic diagram of a preferred embodiment of the invention.

In the preferred embodiment, a pair of transistors $Q_1$ and $Q_2$ of opposite conductivity types are employed, the transistor $Q_1$ being arbitrarily selected to be of the NPN type and the transistor $Q_2$ of the PNP type. The emitter of the transistor $Q_1$ is connected to a source of reference potential, which may be ground as shown, and the collector of the transistor $Q_1$ is connected to a source of positive potential $E_1$. The emitter of the transistor $Q_2$ is connected to a source of potential $E_2$ of the same polarity as the potential $E_1$ but of a lower magnitude. The collector of the transistor $Q_2$ is connected to a source of negative potential $E_3$ through a resistor 11. In order that both transistors be non-conductive in the quiescent state, the base electrode of the transistor $Q_2$ is connected to a source of positive potential $E_4$ through a resistor 12 and the collector of the transistor $Q_2$ is connected to the base electrode of the transistor $Q_1$ by a cross-coupling circuit comprising a resistor 13.

The second cross-coupling circuit from the collector of the transistor $Q_1$ to the base of the transistor $Q_2$ includes an RC timing circuit comprising a resistor 14 and a capacitor 15 connected in series. When the transistors $Q_1$ and $Q_2$ are not conducting, the capacitor 15 charges through a diode 17 to substantially the difference between the potentials $E_1$ and $E_2$. The capacitor 15 could be charged through the resistor 12, but the low impedance path provided by the diode 17 is preferred for charging the capacitor 15 in order to speed recovery time of the circuit and to also provide protection for the base-to-emitter junction of the transistor $Q_2$. However, if the difference between the potential $E_4$ and the potential $E_2$ is less than the breakdown voltage between the emitter and base of the transistor $Q_2$, and fast recovery for the monostable vibrator circuit is not necessary, then the diode 17 may be eliminated from the circuit.

A positive trigger pulse applied to an input terminal 20 connected to the base electrode of the transistor $Q_1$ renders the transistor $Q_1$ conductive, thereby providing a low impedance discharge path for the capacitor 15 through the resistor 14 and transistor $Q_1$. The discharge of the capacitor 15 provides base current to the transistor $Q_2$ to render it conductive. The regenerative action which ensues drives both transistors $Q_1$ and $Q_2$ to saturation. Sustaining base current is supplied to the transistor $Q_1$ through the resistor 13 but the sustaining base current supplied to the transistor $Q_2$ is from the storage capacitor 15. Accordingly, $Q_2$ remains conducting only as long as the capacitor 15 is able to supply base current to the transistor $Q_2$.

The current supplied to the base of the transistor $Q_2$ by the capacitor 15 decays exponentially. The time constant for the discharge of the capacitor 15 is determined by its capacitance and the resistance of the resistor 14, internal impedance of the transistor $Q_1$, and the base-to-emitter junction impedance of the transistor $Q_2$. However, without a diode 21 connected in series with a source of bias potential to a junction between the resistor 14 and the capacitor 15, the transistor $Q_2$ would not be turned off until its base current diminishes to substantially zero after about the third time constant. At that time the slope of the exponential curve approaches zero so that the timing of the monostable multivibrator is very uncertain. The clamping diode 21 improves the timing by cutting off the base current to the transistor $Q_2$ at any predetermined point during the first or second time constant period.

The anode of the clamping diode 21 is connected to a source of positive potential $E_5$ of sufficient magnitude so that, as the capacitor 15 discharges, current is provided to the base of the transistor $Q_2$ only until the clamping diode 21 is forward biased. When the diode 21 is forward biased, it clamps the junction between the resistor 14 and the capacitor 15 to substantially the potential of the source $E_5$. Thus, once the diode 21 becomes forward biased, the capacitor 15 abruptly ceases to provide base current to the transistor $Q_2$.

As an illustration, the bias potentials $E_1$, $E_2$, $E_3$ and $E_4$ may be +10 v., +5 v., −3 v. and +10 v., respectively. The capacitor 15 would then charge to five volts. When the transistor $Q_1$ conducts, the junction between the resistors 10 and 14 is clamped to almost ground potential, thereby forward biasing the base-to-emitter junction of the transistor $Q_2$ with the charge in the capacitor 15 which tends to change exponentially. Without the diode 21, the potential of a junction A between the resistor 14 and capacitor 15 decreases from +10 v. to ground, at which time the capacitor 15 becomes charged to five volts in the opposite direction. However, with the diode 21 connected as shown, the ten-volt change may be interrupted at any point by adjusting the bias potential $E_5$. For example, if the potential $E_5$ is equal to +5 v., the charge of the capacitor 15 will change only until the junction A goes from +10 v. to +5 v. at which time the diode 21 conducts to clamp the junction A at +5 v. less the voltage drop across the diode 21.

When the base current to the transistor $Q_2$ is abruptly cut off, the collector of the transistor $Q_2$ drops to the negative potenial of the source $E_3$, thereby cutting off the transistor $Q_1$.

The power dissipated in the monostable vibrator circuit of the present invention is extremely low in the quiescent state since neither transistor is conducting. The only current flowing while the transistors $Q_1$ and $Q_2$ are cut off is current through resistor 12 and diode 17. However, since resistor 12 may be made quite large, the power actually dissipated may be in the order of only one or two milliwatts. Therefore, the circuit is quite useful in systems where power dissipation is a critical factor, such as in microminiaturized systems where heat dispersion is a problem or systems to be used in space vehicles. However, if the difference between the potential $E_4$ and $E_2$ is made small, and fast recovery of the circuit is not necessary, the diode 17 may be omitted to eliminate the power being dissipated in the quiescent state through the resistor 12.

The load on the circuit of the present invention may exceed the load on a conventional monostable multivibrator circuit for the reason that the base currents are supplied by the collector currents of the cross-coupled transistors to provide a beta multiplication of base currents. In addition, due to the use of complementary transistors, a large voltage difference exists between the base electrodes and the respective cross-coupled collectors so that the available base current may be accurately controlled by the resistors 13 and 14.

A further advantage of the present invention is that the timing capacitor 15 may be smaller in capacitance than in conventional monostable multivibrator circuits because of the beta multiplication of base currents provided by the complementary transistors. Several advantages result from the use of a smaller timing capacitor. For example, the circuit lends itself to solid state circuit construction where large capacitance values are extremely difficult to achieve. In addition, the accuracy of the RC timing circuit may be improved since tolerances on resistors may be controlled more closely.

The main advantages, however, are that output signals derived from the collectors of the transistors $Q_1$ and $Q_2$ in the usual manner are accurately timed by adjusting the value of the bias voltage $E_5$ of the diode 21 after a suitable RC time constant is selected for the circuit and that the recovery time of the circuit is readily decreased by the provision of diode 17.

While the principles of the invention have now been made clear in an illustrative embodiment, obvious modifications particularly adapted for specific environments and operating requirements may be made without departing from those principles. The appended claims are therefore intended to embrace any such modifications.

What is claimed is:

1. A monostable multivibrator circuit comprising
first and second transistors of opposite conductivity types each of said transistors having a base, an emitter and a collector,
means providing direct current biasing potentials for the emitters and collectors of said transistors,
means for providing direct current biasing potential for the base electrode of said second transistor to render said second transistor normally non-conductive,
direct current conductive means coupling the collector of said second transistor to the base of said first transistor to render said first transistor non-conductive while said second transistor is non-conductive,
a timing circuit connected between the collector of said first transistor and the base of said second transistor, said timing circuit including an electrical energy storage element in series with an impedance element,
means connected to the base electrode of one of said transistors for applying a trigger pulse thereto to render said transistors conductive, thereby providing a discharge path for said electrical energy storage element through said impedance element and said first transistor and through the base-to-emitter junction of said second transistor,
clamping means connected to said timing means for limiting discharge of said electrical energy storage element below a pre-determined value whereby said first and second transistor are rendered non-conductive after a predetermined period of conduction determined by discharge of said storage element in said timing means in cooperation with said clamping means, and
unilateral conducting means connected between the base and emitter of said second transistor and poled for forward conduction to charge said storage element in said timing means when said transistors are not conducting.

2. A monostable multivibrator circuit comprising
a first transistor of one conductivity type having a base, emitter and a collector electrode,
a second transistor of an opposite conductivity type having a base, an emitter and a collector electrode,
means providing direct current biasing potentials for the emitter and collector electrodes of said transistors,
means directly connecting the collector of said second transistor to the base of said first transistor,
means including an electrical energy storage element in series with an impedance element connecting the collector of said first transistor to the base of said second transistor,
means for providing a conductive charge path for said storage element and for cut-off biasing said second transistor,
means connected to the base of one of said transistors for applying a trigger pulse thereto to render said transistors conductive whereby electrical energy in said storage element is discharged through said impedance element and said first transistor to provide base current in said second transistor,
a first unilateral conducting element having a first terminal connected to a junction between said impedance element and said storage element, said first unilateral conducting element having its second terminal connected to a source of bias potential and so poled as to be biased non-conductive until said storage element has discharged through said impedance element sufficiently to forward bias said first unilateral conducting element, thereby terminating base current in said second transistor and cutting off said second transistor, and a second unilateral conducting element connected between the base and emitter of said second transistor and poled for forward current conduction to charge said storage element.

3. A monostable multivibrator circuit comprising first and second transistors having complementary symmetry, each of said transistors having a base, an emitter and a collector, a direct current conductive connection between the collector of said second transistor and the base of said first transistor, a resistor and a capacitor connected in series between the collector of said first transistor and the base of said second transistor, means for providing circuit current biasing potentials for the emitters and collectors of said transistors, means for providing direct current biasing potentials for the base of said second transistor whereby said first and second transistors are rendered normally non-conductive and said capacitor is charged to a predetermined potential, means connected to the base of one of said transistors for applying a trigger pulse thereto to render said first and second transistors conductive whereby said capacitor is discharged to provide base current in said second transistor, a first unilateral conducting element having a first terminal connected to a junction between said series connected resistor and capacitor and a second terminal connected to a direct current biasing potential until said junction reaches a potential which forward biases said unilateral conducting element whereupon base current in said second transistor is terminated and said first and second transistors are cut-off, and a second unilateral conducting element connected between the base and emitter of said said second transistor and poled for forward current conduction to charge said capacitor whereby said monostable multivibrator circuit is provided with fast recovery when said transistors are rendered non-conductive.

References Cited by the Examiner

UNITED STATES PATENTS

| | | | |
|---|---|---|---|
| 2,770,732 | 11/1956 | Chong | 307—88.5 |
| 3,033,998 | 5/1962 | Nellis | 307—88.5 |
| 3,065,362 | 11/1962 | Benson | 307—88.5 |
| 3,107,309 | 10/1963 | Hitt | 307—88.5 |

OTHER REFERENCES

IBM Technical Disclosure Bulletin, vol. 4, No. 5, October 1961, "Monostable Trigger" by Brode et al.

ARTHUR GAUSS, *Primary Examiner.*

J. JORDAN, *Assistant Examiner.*